C. H. KICKLIGHTER.
METHOD OF JOINING METAL BY ELECTRIC WELDING.
APPLICATION FILED JULY 28, 1919.

1,367,553.

Patented Feb. 8, 1921.

INVENTOR
Chas. H. Kicklighter.

UNITED STATES PATENT OFFICE.

CHARLES H. KICKLIGHTER, OF ATLANTA, GEORGIA.

METHOD OF JOINING METAL BY ELECTRIC WELDING.

1,367,553. Specification of Letters Patent. Patented Feb. 8, 1921.

Application filed July 28, 1919. Serial No. 313,777.

*To all whom it may concern:*

Be it known that I, CHARLES H. KICK-LIGHTER, a citizen of the United States, and a resident of Atlanta, in the county of Fulton and State of Georgia, have invented new and useful Improvements in the Methods of Joining Metal by Electric Welding, of which the following is a specification.

The invention relates to a method of joining two pieces of metal by the use of a special intermediate metallic body, which is welded to both of the two pieces and is, at the same time, softened and forced into a depression or void in one of the pieces so as to allow the faces of the two pieces to come into immediate contact. The intermediate body consists of a disk of varying thickness, flat on one side to contact with the surface of one plate or piece of metal and conical on the other side to contact with a conical depression in the other plate or piece of metal. The invention also relates to a seam between metal plates, in which the metal plates are united through the medium of metal disks, flat on one side and conical on the other and welded to the flat surface of one plate and the surfaces of conical depressions in the other. The invention also relates to metal work having its elements united by such seams and by the use of metal disks of above description.

The object of the invention is to afford an easy simple and practical method of fastening plates or similar pieces of metal by the electric welding process.

In the electric welding of heavy commercial stock I have found that best results are obtained by having the areas of initial contact substantially the same as the areas of the desired weld. In this case, upon the application of pressure and electric heating current, the surfaces of contact are brought to a welding heat at all points at about the same instant and a thorough fusion of the metal at all points is obtained by the time the intermediate metal is softened sufficiently to be forced into conformity with the void or depression. This is a feature of vital importance, for if they do not at first contact substantially along the areas of desired weld, the fused intermediate body will soften and come in contact with relatively cold portions of the plate and fusion to these portions will either not occur or will be poor and uncertain. I have had excellent results by using flat disks in flat bottom depressions, but have had some difficulty in cutting flat bottom depressions on a practical and commercial scale. On the other hand, I have found that a conical depression may be cut with the greatest ease by using the end of an ordinary machinist drill. One surface of the disks may be easily made to conform to this depression. I fasten the disks in their depressions by slightly fusing therein, so as to hold in place while bringing the other plate into juxtaposition.

Figure 2:
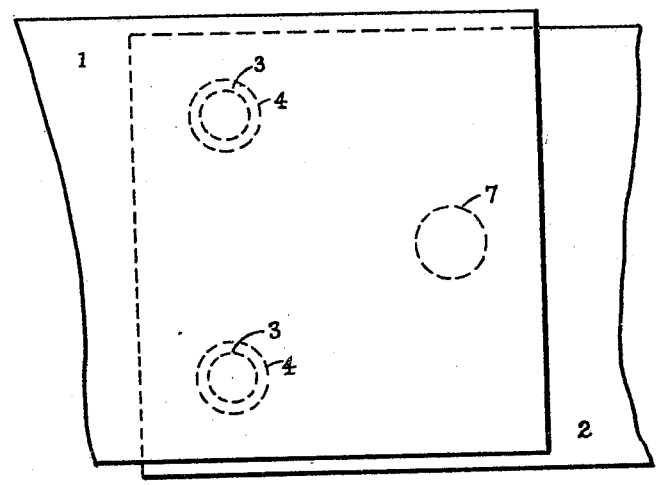
Fig. 2 is a top view of the plates of Fig. 1.
Figure 1:
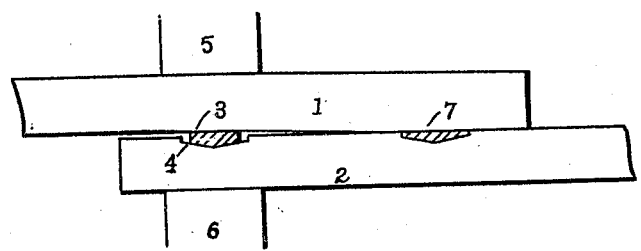
Figure 1 is a diagrammatic sketch, partially sectioned, showing one application of the present invention.

Referring to Figs. 1 and 2, the plates or pieces of metal 1 and 2 are to be fastened together. The circular disk 3, of variable thickness, flat on one side and slightly conical on the other, rests in the conical depression 4 of plate 2 and its projecting flat surface contacts with plate 1. The disk 3 may be fastened in place, sufficiently to prevent displacement, before plate 1 is brought in place by fusing some point on the conical surface of disk 3 to a corresponding point of the conical depression 4.

The pressure terminal blocks 5 and 6 are adapted to be pressed upon the plates on directly opposite sides. By means of these blocks the assembled parts may be subjected to mechanical pressure, and at the same time to a heavy electric welding current. These blocks may be the terminals of the secondary circuit of an electric welding machine, the construction of which is well known in the art.

Upon the application of pressure and the welding electric current, the contacting parts are welded together and the disk 3 is softened and forced downward into the depression 4 so as to allow the plates to come into immediate contact. The position and shape of the disk after the welding operation is shown by 7. Fig. 2 represents a top view of the plates of Fig. 1, with the pressure terminals removed.

Figure 3:
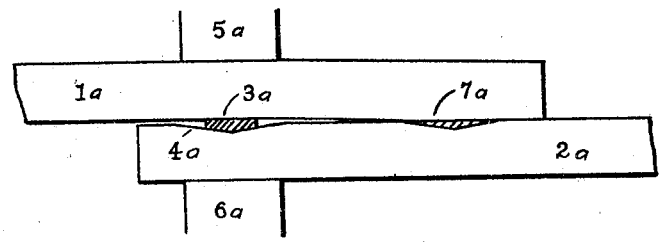
Fig. 3 is a diagrammatic sketch, partially sectioned, showing a slightly modified application of the invention.

Referring to Fig. 3, the intermediate metallic disks $3^a$ are of the same design, but slightly different shaped depressions $4^a$ are employed. The plates or pieces of metal $1^a$ and $2^a$ are to be fastened, as above described, when subjected to pressure and electric welding current, by the welding terminals $5^a$ and $6^a$. The position and shape of a disk after the welding operation is illustrated by $7^a$.

Figure 4:
Fig. 4 is a side view of the intermediate metallic disk used in Figs. 1, 2 and 3.

Fig. 4 illustrates a side view of the intermediate metallic disk 3 of Fig. 1, or $3^a$ of Fig. 3. It is thin and of variable thickness, having one surface flat to conform to the surface of a metal plate, and another surface slightly conical to conform to the bottom of a conical depression in another plate. These surfaces of proposed initial contact of the disk with the plates are substantially the same in area as the areas of desired final welded union.

The operation is apparent. After the preparation of the parts by making conical depressions in the surface of one or both of the plates or pieces of metal, metal disks, flat on one surface and conical shaped on the opposing surface, are introduced into the depressions with the conical surfaces of the disks contacting with the conical bottoms of the depressions. After fastening therein, another plate is brought in contact with the flat projecting surfaces of the disks. The assembled parts are then subjected to pressure and heating electric current. The disks are welded to both plates and are softened and forced into the depressions so as to permit the faces of the plates to come into immediate contact.

What I claim is:

1. The method of fastening two metal plates together, face to face, which consists of forming a conical depression in one of the plates, of introducing into said depression a metallic disk with a conical surface thereof contacting with the conical surface of said depression and with a flat surface thereof projecting without the depression so as to hold the plates apart, of bringing the other plate into contact with said projecting surface, and by the application of pressure and electric heating current of welding the disk to both of the plates and of forcing it into the depression so that the plates may come into immediate contact.

2. The method of fastening two pieces of metal together, face to face, which consists of introducing a metallic disk, having one flat surface and an opposite conical surface, into a conical depression in one of the plates so that the conical surface of the disk conforms with the conical surface of the depression on an area substantially the same as that of the desired weld, of bringing the other piece of metal into contact with the opposite flat surface of the disk, and by the application of pressure and heating electric current of welding the disk to both of the pieces of metal.

3. Composite metal work having its elements united by a metallic disk located between the elements and welded to the original flat surface of one element and to the surface of a conical depression formed in the other element.

4. A seam or joint between plates or pieces of metal, consisting of metallic disks located there-between and welded to the original flat surface of one plate or piece of metal and to the surfaces of conical depressions in the other plate or piece of metal.

5. A seam between plates of metal having metallic disks welded on one of their sides to the flat surfaces of one of the plates and welded on their opposite sides to the surfaces of conical depressions in the other plate and having the metallic disks forced into the depressions so that the plates come into immediate contact.

6. A seam between metal plates having metal disks there-between with the original flat surfaces of the disks fused to the original flat surfaces on one of the plates and having the original conical surfaces of the disks fused to the surfaces of conical depressions formed in the other plate.

7. The method of fastening two metal plates together, face to face, which consists of forming a conical depression in one of the plates, of fastening therein a metallic disk having a flat surface thereof projecting without the depression, of bringing the other plate into contact with said projecting surface, and by the application of pressure and heating electric current of welding the disk to both of the plates and of forcing it into the depression so that the plates may come into immediate contact.

8. The method of fastening two pieces of metal together, face to face, which consists of fusing metallic bodies into conical depressions in one of the plates, of bringing the other piece of metal into contact with the opposite projecting flat faces of the metallic bodies, and by the application of pressure and heating electric current of welding the metallic bodies thoroughly to both pieces of metal.

9. Composite metal work having its elements united by metallic disks located there-between and welded to the flat surface of one element on an area substantially the same as originally contacted with and welded to the bottom of a conical depression of the other element on an area substantially the same as originally contacted with.

In testimony whereof, I have hereunto signed my name in the presence of two subscribing witnesses at Atlanta in the county of Fulton and State of Georgia this 21 day of July, 1919.

CHARLES H. KICKLIGHTER.

Witnesses:
S. L. MORGAN,
K. C. MARKT.